(12) United States Patent
Vigneaux

(10) Patent No.: US 8,305,228 B2
(45) Date of Patent: Nov. 6, 2012

(54) METHOD AND APPARATUS FOR LOCATING A PLUG WITHIN THE WELL

(75) Inventor: Pierre Vigneaux, Moisenay (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 449 days.

(21) Appl. No.: 12/299,156

(22) PCT Filed: May 4, 2007

(86) PCT No.: PCT/EP2007/004033
§ 371 (c)(1),
(2), (4) Date: May 11, 2009

(87) PCT Pub. No.: WO2007/131662
PCT Pub. Date: Nov. 22, 2007

(65) Prior Publication Data
US 2009/0219171 A1 Sep. 3, 2009

(30) Foreign Application Priority Data
May 12, 2006 (EP) ..................... 06290801

(51) Int. Cl.
*G01V 3/00* (2006.01)
(52) U.S. Cl. ................... 340/854.6; 340/854.7
(58) Field of Classification Search ............. 340/854.6, 340/854.7
See application file for complete search history.

(56) References Cited

U.S. PATENT DOCUMENTS

| 252,956 | A | | 1/1882 | Loane |
| 3,547,406 | A | | 12/1970 | Bielstein et al. |
| 5,528,404 | A | * | 6/1996 | MacKichan ................... 398/21 |
| 6,561,488 | B1 | | 5/2003 | Walker |
| 6,634,425 | B2 | | 10/2003 | King et al. |
| 2004/0060697 | A1 | | 4/2004 | Tilton et al. |

FOREIGN PATENT DOCUMENTS

| GB | 2119949 | | 11/1983 |
| GB | 2349440 A | * | 11/2000 |
| GB | 2393465 | | 3/2004 |
| WO | 02/059458 | | 8/2002 |
| WO | 02/082151 | | 10/2002 |
| WO | WO 2004/020789 | * | 3/2004 |
| WO | WO 2004020789 A2 | * | 3/2004 |

* cited by examiner

*Primary Examiner* — William P Neuder
(74) *Attorney, Agent, or Firm* — Matthias Abrell

(57) ABSTRACT

Fiber-optic cable systems are useful for locating a cementing apparatus in the wellbore, for example a cement plug. A reel of fiber-optic cable is attached to the cementing apparatus. At the surface the cable is attached to a stationary position where it is connected to a light transmitter/receive device. As the cementing apparatus travels down the cased wellbore, the cable unwinds, thereby changing the nature of the reflected light signal and allowing one to deduce the position of the cement plug within the well.

19 Claims, 2 Drawing Sheets

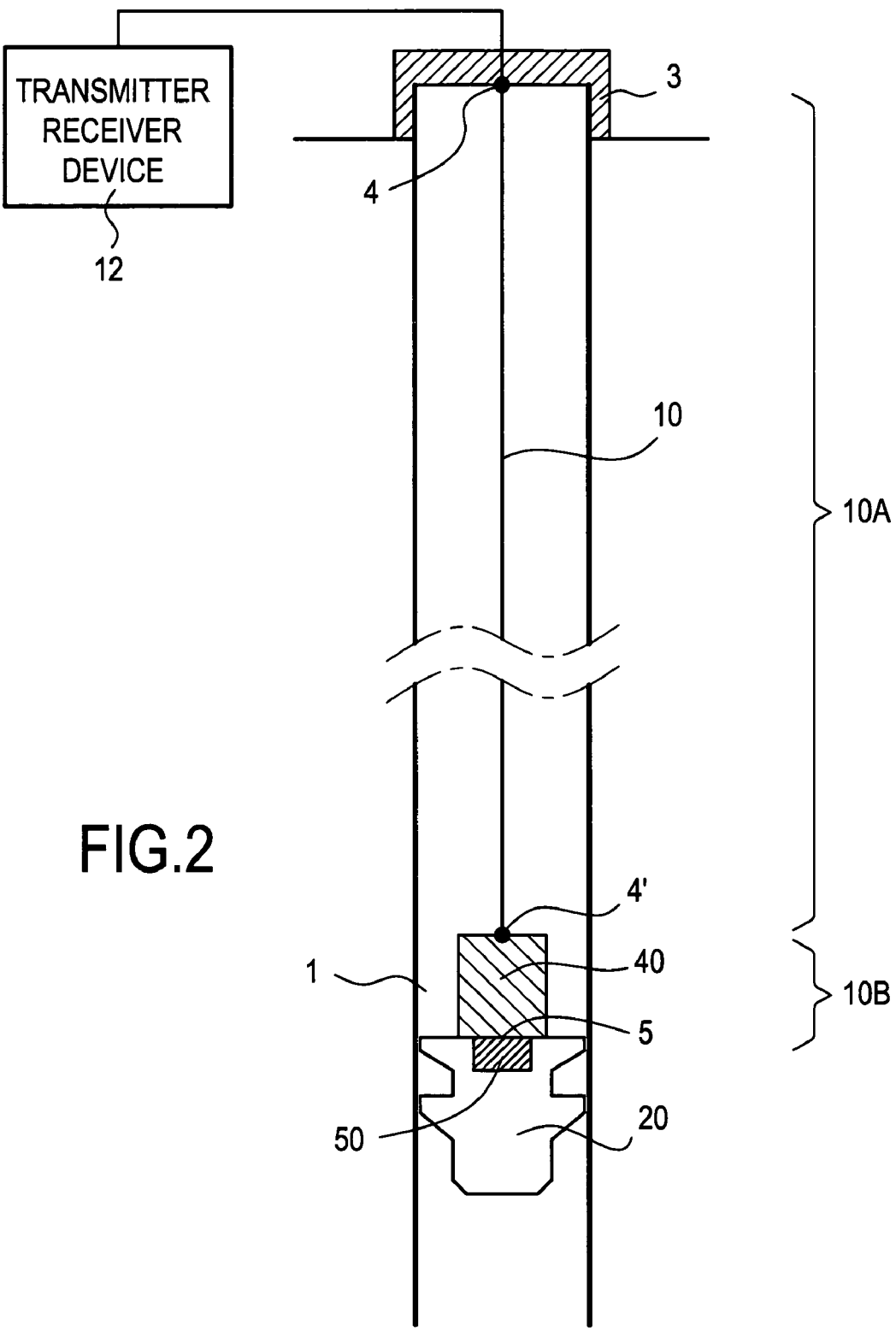

METHOD AND APPARATUS FOR LOCATING A PLUG WITHIN THE WELL

FIELD OF THE INVENTION

The present invention generally relates to apparatus and methods for completing a well. Particularly, the present invention relates to apparatus and methods for locating a cementing apparatus in the wellbore, as a cement plug. More particularly, the present invention relates to apparatus and methods for determining the position of the cement plug within the well.

DESCRIPTION OF THE PRIOR ART

After a well has been drilled, the conventional practice in the oil industry consists in lining the well with a metal casing. An annular area is thus formed between the casing and the formation. A cementing operation is then conducted in order to fill the annular area with cement. The combination of cement and casing strengthens the wellbore and facilitates the isolation of certain areas of the formation behind the casing for the production of hydrocarbons. It is common to employ more than one string of casing in a wellbore. In this respect, a first string of casing is set in the wellbore when the well is drilled to a first designated depth. The first string of casing is hung from the surface, and then cement is circulated into the annulus behind the casing. The well is then drilled to a second designated depth, and a second string of casing, or a liner, is run into the well. The second string is set at a depth such that the upper portion of the second string of casing overlaps the lower portion of the first string of casing. The second liner string is then fixed or hung off of the existing casing. Afterwards, the second casing string is also cemented. This process is typically repeated with additional liner strings until the well has been drilled to total depth. In this manner, wells are typically formed with two or more strings of casing of an ever-decreasing diameter.

The process of cementing a liner into a wellbore typically involves the use of liner wiper plugs and drill-pipe darts. Plugs typically define an elongated elastomeric body used to separate fluids pumped into a wellbore. A liner wiper plug is typically located inside the top of a liner, and is lowered into the wellbore with the liner at the bottom of a working string. The liner wiper plug has radial wipers to contact and wipe the inside of the liner as the plug travels down the liner. The liner wiper plug has a cylindrical bore through it to allow passage of fluids.

Typically, the cementing operation requires the use of two plugs and darts. When the cement is ready to be dispensed, a first dart is released into the working string. The cement is pumped behind the dart, thereby moving the dart downhole. The dart acts as a barrier between the cement and the drilling fluid to minimize the contamination of the cement. As the dart travels downhole, it seats against a first liner wiper plug and closes off the internal bore through the first plug. Hydraulic pressure from the cement above the dart forces the dart and the plug to dislodge from the liner and to be pumped down the liner together. At the bottom, the first plug seats against a float valve, thereby closing off fluid flow through the float valve. The pressure builds above the first plug until it is sufficient to cause a membrane in the first plug to rupture. Thereafter, cement flows through the first plug and the float valve and up into the annular space between the wellbore and the liner.

After a sufficient volume of cement has been placed into the wellbore, a second dart is deployed. Drilling mud is pumped in behind the second dart to move the second dart down the working string. The second dart travels downhole and seats against a second liner wiper plug. Hydraulic pressure above the second dart forces the second dart and the second plug to dislodge from the liner and they are pumped down the liner together. This forces the cement ahead of the second plug to displace out of the liner and into the annulus. This displacement of the cement into the annulus continues until the second plug seats against the float valve. Thereafter, the cement is allowed to cure before the float valve is removed.

The cementing operation can also require the use of a single plug and dart: the first plug or dart of the preceding operation being removed.

During the cementing operation, it is desirable to know the location of the second plug/dart in the wellbore, or at least its movement in the wellbore. Generally, the position of the plug will indicate the amount of cement that has been displaced into the annulus. If insufficient cement is displaced (called "underdisplacement"), cement will remain in the casing. If too much cement is displaced, (called "overdisplacement"), portions of annulus will not be cemented.

A method of determining the plug location is by measuring the volume displaced after the second plug is released. Then, the volume displaced is compared to the calculated displacement volume based upon the dimensions of the casing or drill pipe. The drawback of the displacement method is that it is not very accurate and does not give a positive indication that the plug is moving at the same rate as the fluid being pumped behind the plug. Casing and drill pipe are generally manufactured to dimensional tolerances that could result in a substantial difference between the calculated displacement volume and the actual displacement volume. Further, fluids are subject to aeration and compression during the operation, thereby affecting measured volume.

Another method is attaching an indication wire to indicate that a plug has been released. The indication wire is usually 2 to 3 feet in length. Other method uses a mechanical flipper indicator. In this method, a lever is disposed below the plug container. A released plug will shift the lever when the plug travels by it. The drawback is that indicator wires and mechanical flipper indicators only indicate that the plug has been released, not the location thereof.

Another method is using electromagnetic or magnetic signals. Generally, an identification tag is attached to the plug or dart. A detector located below the cementing head picks up the signal when the plug passes to indicate that the plug has been launched. The problem is that the signal detectors cannot track the plug for long distances and only indicate that the plug has moved past the detection device.

Another method is described in U.S. Pat. No. 6,634,425. A cementing plug with a sensor transmits the measured value to surface location via wire or wireless transmitting means, as for example: wire cable, fiber optic or acoustic waves. The problem is that the cementing plug can not be deployed for long distances.

Another method is described in patent application US20040060697. Indeed the system is an improvement in the method of locating a plug in the wellbore, the system is insufficient because still applying to an "indication wire" method. A fiber optic is used to locate the plug. The fiber optic is provided with markings to facilitate the reading of the length dispensed. Alternatively, one or more rollers may be disposed below the dispensing apparatus. As the fiber is dispensed, it will cause the roller to rotate a respective distance. The length of the fiber dispensed is calculated from the number of revolutions made by the roller. The problem of reading the position of the plug thanks to the length deployed of the fiber is not very accurate because in operation, the fiber may elongate or strain under the weight of the plug or the drilling mud behind the plug. Also, patent application US20040060697 discloses a correction method of this drawback where the fiber optics line may be equipped with one or more sensors to provide a more accurate indication of the location of the dart. A single discrete sensor is disposed on the fiber near the dart. The dart travels in a running string and is coupled to a dispensing apparatus disposed at the surface. An optical signal sent from the surface must travel the full distance along the fiber to reach the sensor. Typically, the distance can be determined by measuring the total time required for the signal to travel from the optical signal source to the sensor and then to the receiver. Because the total length of fiber and the amount of fiber dispensed are known, any elongation of the fiber due to strain may be adequately accounted for. As a result, the location of the dart is determined in real time. The problem is that the method asks a complex deployment of devices and difficult measurement process: fiber's roller with markings, transmitter/receiver on one side, sensor on the other side.

Further, U.S. Pat. No. 6,561,488 describes a method to deploy a cable in a pipeline, avoiding major drawback of the conventional deployment technique by suppressing the strain problem in unwinding process of the fiber. However, U.S. Pat. No. 6,561,488 does not interest on measurement of the position of the plug. Patents GB2119949 and WO02082151 describe also similar methods.

There is a need, therefore, for an easy apparatus for locating a plug in the wellbore. Further, there is a need for an apparatus for determining parameters informing on the set of the cement.

SUMMARY OF THE INVENTION

According to one aspect of the invention, the invention provides an apparatus for determining the location and/or the displacement of an object in a wellbore, comprising: a reel of wound optic fiber line (or fiber) fixed to the object, and a light transmitter/receiver device able to generate a signal and to measure a change of said signal when occurring at the second position; wherein the optic fiber line is: on a first position fixed to a reference point linked to the light transmitter/receiver device, and is on a second position unwound from the reel. The reel is directly fixed to the object or via a housing. The light transmitter/receiver is a transmitter/receiver not only limited to visible light, other electromagnetic radiations including ultraviolet radiations (near UV (380-200 nanometers wavelength); and/or far or vacuum UV (200-10 nanometers; FUV or VUV); and/or extreme UV (1-31 nanometers; EUV or XUV)) and infrared radiations (preferably: O-band 1260-1360 nanometers; and/or E-band 1360-1460 nanometers; and/or S-band 1460-1530 nanometers; and/or C-band 1530-1565 nanometers; and/or L-band 1565-1625 nanometers; and/or U-band 1625-1675 nanometers) are enclosed in the light transmitter/receiver. The reel is unwound under the movement of the object. By this principle, two points are defined the reference point corresponding to the first position and a dynamic point corresponding to the second position or the location of the dynamic object. Accordingly, the apparatus can measure a position of the dynamic object (depth) or a movement or displacement of the dynamic object (speed, acceleration). The reference can be static or dynamic; importance is to know where this reference point is. The major advantage of this technique is the ability to perform the localization of the object from a single fiber end: the reference.

The light transmitter/receiver device is an apparatus able to measure the change of the signal at the second position. Effectively, there is no need to measure a change of the signal all along the optic fiber line; the only interesting change informing on the location or the displacement of the dynamic object is on the second position. The signal change can be made thanks to an optical event, as a modification of the morphology of the optic fiber line, more precisely a bend in the optic fiber line. There is way to enforce the optical event. Firstly, the reel can have a diameter of winding or a curvature on the reel short enough to create a bend at the second position producing the change of the signal at the second position. Secondly, an additional element can be added on the second position to create a bend at the second position producing also the change of the signal at the second position. All these advantageous embodiments ensure that the major optical event is located at the second position and is detected more precisely.

Preferably, the light transmitter/receiver device is an apparatus in the family of optical time domain reflectometer (OTDR). Effectively, the reflectometer will inject a short but intense light pulse into the optic fiber line from the first position and will measure the backscatter and reflection of light as a function of time. The bend created on the second position will ensure an attenuation which will be detected by the reflectometer. Preferably if needed to be cost effective, this light transmitter/receiver device is a fiber break locator (FBL), which is roughly a simplify reflectometer designed to only detect break along the fiber.

The apparatus of the invention applies to objects as a dart or a plug. The reel has a diameter between 20 and 50 millimeters, and preferably between 30 and 35 millimeters for a light pulse wavelength of 1310 or 1550 nanometers.

According to another aspect of the invention, the apparatus can be deployed with one or more sensors informing on property of the environment surrounding the sensor. Also, the optic fiber line is linked to a sensor located on the object. Effectively, because a fiber is already deployed between the surface and the object, a signal can be transmitted along the fiber from the surface to the sensor and from the sensor to the surface. This second embodiment is compatible with the location apparatus: for the location, the light transmitter/receiver device focuses only on the bend at the second position; for the sensor, the light transmitter/receiver device uses all the fiber to transmit and receive signal from the sensor. The object can have all types of sensor and associated electronic including power supply to measure physical parameters of the environment: temperature, pressure, pH, salinity, density, resistivity, or conductivity. For example, when the object is a plug, sensor can be an ultrasonic gauge for measuring the wait on cement (WOC).

More preferably, the sensor is a sensor self supplied in power. The associated electronics are small and with low consummation: a sensor with limited volume and limited power supply allow a minimum bulk. For example, sensors can be of the type MEMS. Most preferably, the sensor is auto-sufficient in terms of power supply. For example, sensors can be of the type optical sensor; when an optical signal is sent to the optical sensor, the signal reflected by said sensor informed on the measured physical parameter. For example, the sensor is a temperature sensor and/or a pressure sensor in the family of Bragg grating sensor. The major advantage is that there is no need of complex or unwieldy electronic or power supply to support the sensor. All the electronic and analyzing part is at the surface, a signal is sent from the surface to the object and to the embedded sensor, the reflected signal received at the surface is analyzed and informs on the measured physical parameter in the vicinity of the sensor on the object. For example, the object is a plug comprising an embedded Bragg grating sensor informing on the temperature of the cement function of time, thanks to the temperature profile function of time the WOC can be measured.

According still to another aspect of the invention, the apparatus can be deployed with one or more actuators to be activated on the object.

The invention provides also a method for determining a location and/or a displacement of an object in a wellbore, comprising: (i) fixing a reel of wound optic fiber line on the object; (ii) fixing the optic fiber line on a first position to a reference point; (iii) moving the object so that the optic fiber line is unwound from the reel on a second position; (iv) generating from the first position a signal along the optic fiber line; (v) measuring from the first position a change of the signal along the optic fiber line wherein this change of the signal informs on the second position; and (vi) deducing from this change the location and/or the displacement of the object. The measurement can be realized when the object is in movement or is in static position.

Preferably, the method further comprises fixing means able to create the change of the signal at the second position. Preferably also, the method further comprises the step of generating from the first position another or more signal along the optic fiber line.

In another embodiment, the method further comprises the step of (i) fixing on the object, means for sensing the property of the environment surrounding the object and the means for sensing being linked to the optic fiber line; and (ii) deducing from the change of the signal the property of the environment surrounding the object. Preferably, at least two signals are generated from the first position, and the measured change of one signal informs on the second position and the measured change of one other signal informs on the property of the environment surrounding the object.

Still in another embodiment, the method further comprises the step of (i) fixing on the object, means for actuating the object and the means for actuating being linked to the optic fiber line; and (ii) generating from the first position a second signal along the optic fiber line for actuating the object.

The invention provides as well a method for determining a property of an environment surrounding an object in a wellbore, comprising: (i) fixing a reel of wound optic fiber line on the object; (ii) fixing on the object, means for sensing the property of the environment surrounding the object and the means for sensing being linked to the optic fiber line; (iii) fixing the optic fiber line on a first position to a reference point; (iv) moving the object so that the optic fiber line is unwound from the reel on a second position; (v) generating from the first position one or more signals along the optic fiber line; (vi) measuring from the first position a change in the one or more signals; and (vii) deducing from this change the property of the environment surrounding the object and the location of the object.

The invention provides as well a method for actuating an object in a wellbore, comprising: (i) fixing a reel of wound optic fiber line on the object; (ii) fixing the optic fiber line on a first position to a reference point; (iii) moving the object so that the optic fiber line is unwound from the reel on a second position; (iv) generating from the first position one or more signals along the optic fiber line; (v) measuring from the first position a change in the one or more signals; (vi) deducing from this change the location of the object; and (vii) generating from the first position second signal along the optic fiber line for actuating the object.

BRIEF DESCRIPTION OF THE DRAWINGS

Further embodiments of the present invention can be understood with the appended drawings:

FIG. 2 shows a schematic diagram illustrating the apparatus in a second embodiment according to the invention.

DETAILED DESCRIPTION

Figure 1:
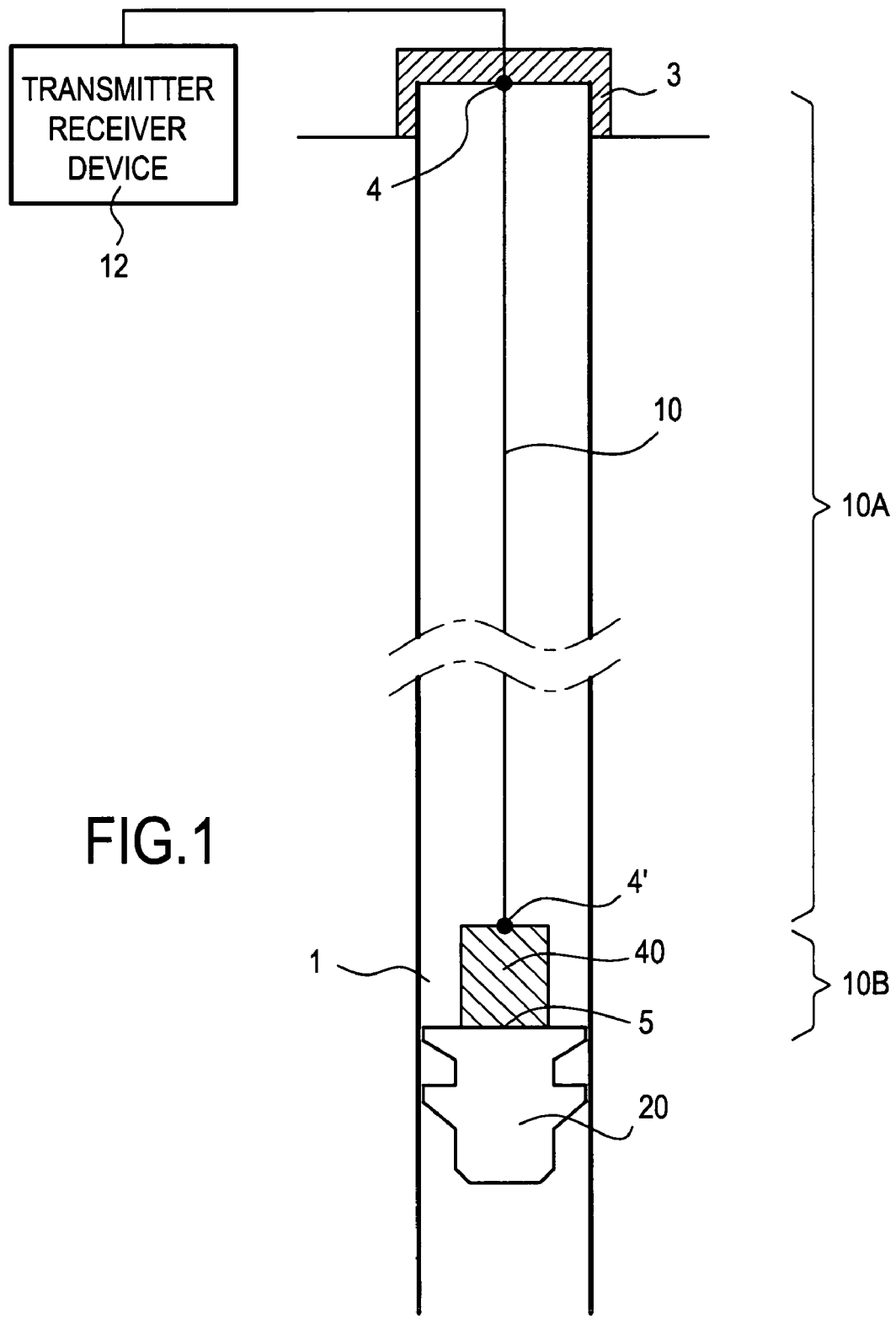
FIG. 1 shows a schematic diagram illustrating the apparatus in a first embodiment according to the invention.

FIG. 1 is a view of the apparatus deployed in a cased wellbore 1. A plug 20 is shown moving along the wellbore thanks to a wellbore fluid such as drilling mud that is pumped in behind the plug. This plug separates the cement from the drilling mud to minimize contamination of the cement. As the plug moves along the wellbore, the cement in front of the plug is displaced into the wellbore.

An optic fiber line 10 or fiber which is wound in a reel 40 is attached to an upper portion of the plug; practically the reel is attached or fixed through a unique point of hanging 5 which correspond to an end of the fiber or through a part of the reel. The reel can also be mounted in a housing or cartridge. The importance is that when the plug moves along the wellbore, the reel and the plug are interdependent, but the fiber can be unwound from the reel. On the other end of the fiber, the fiber is attached or fixed to a first position 4, or a reference point. As it is understood, the fiber is unwound from the reel thanks only to the movement of the plug at a second position 4', which correspond to a dynamic point. An upper part 10A of the fiber corresponds to the unwound fiber (between the first position and the second position) and a lower part 10B of the fiber corresponds to the wound fiber, still in the reel. The dynamic point versus the reference point or the second position versus the first position informs on the location of the plug within the well or on the displacement rate of the plug within the well.

One advantage of using optic fiber line 10 is its size, because it can be easily installed within the plug and contradictory its fragility, because it can be easily destructed after end of the cementing job, for example with a drilling tool or because it will not damage other expensive tool. Generally, the fiber has a smaller outer diameter than other wire products such as a wireline cable. As such, any fiber remaining in the wellbore can easily be drilled out, thereby minimizing any problems associated with materials left in the wellbore. Additionally, optic fiber lines are tolerant of high temperatures and corrosive environments when protected by its protective coating, and thus have broad application in the oil industry. The optic fiber line used can be on any type of fiber optic, multimode or single mode. Preferably if needed to be cost effective, single mode optic fiber line is used.

The reel 40 of wound optic fiber line is made in such a way that the windings of the fiber ensure that the fiber can simply be unwound from the reel with a minimum tension applied on the fiber reel. By unwinding the reel from the plug rather than from the surface, the fiber is deployed without any movement within the wellbore. This way, the only mechanical force applied on the fiber is the drag force coming from the drilling mud flow; there is no additional tension. The windings have to consider that unwinding can be operated at low or high speed, with low or high density for the surrounding fluid. Also one important parameter to consider is the way the fiber will be unwound. The reel of wound optic fiber line is made in such a way that the windings of the fiber ensure that the deployed fiber has a known trajectory or curve. The twist or torsion of the fiber on the reel and windings are chosen accordingly.

Effectively, as shown on FIG. 1, the trajectory of the fiber 10 is rectilinear or substantially rectilinear on part 10A. Trajectory, as for example an helix with known radius and vertical separation, can also be used. Trajectory can also be chosen so the fiber touches the wall of the wellbore: the radius of the helix is larger than the radius of the wellbore. Other more complex trajectory can also be chosen. Thanks to the advantageous properties of the fiber, size and weight, this trajectory will be unchanged within the wellbore, during unwinding or some times after the unwinding.

In addition to the way the fiber is wound and the winding of this last one, an additional means to fix or to stick the windings of fiber can be used: a special glue, a physical or chemical treatment of the fiber. Also, the fiber can be further treated so it is chemically resistant and able to withstand the huge abrasion of solid particles flowing at high speed within the wellbore for a certain period of time (typically 12 hours). For that purpose, fibers can be specially treated or can be packaged within a protective jacket. Additionally the reel can be associated with a housing or a dispensing cartridge which supports the winding of the fiber. The housing or the cartridge can directly be attached or fixed to the plug.

The first position 4 is located inside a cementing head 3, which is a static point. From this first position the fiber is linked to a light transmitter/receiver device 12 via a feedthrough: the low-pressure side being connected to the device 12 and the high-pressure side being connected to the optic fiber line 10. The light transmitter/receiver device is an Optical Time Domain Reflectometer (OTDR). The OTDR is an instrument that analyzes the light loss in a fiber. The working principle consists to inject a short, intense laser pulse into the fiber and to measure the backscatter and reflection of light as a function of time. The reflected light is analyzed to determine the location of any fiber optic event like splices, break or fiber end. In a simpler design often defined as Fiber Break Locator (FBL), the functionality is limited to the distance measurement of the first large optical event. Preferably, the light transmitter/receiver device 12 is a FBL.

A characteristic of the fiber is known with enough precision to calculate the length of the deployed fiber (Part 10A) or of all the length of the fiber (Parts 10A and 10B). For example index of the fiber is known, n=1.4752. As the plug is moving away from the cement head, the plug movement unwinds the fiber. The fiber deployed within the wellbore does not present any particularity that could substantially attenuate the propagation of the optical pulse (Part 10A). By creating an optical event at the plug level corresponding to the second position 4', the FBL will give the actual position of the plug.

In a first embodiment, the reel is made with a short diameter of winding or more precisely a diameter short enough to be detected by the FBL (critical diameter $d_c$ or critical radius $r_c$, $2r_c=d_c$); effectively the short diameter creates an attenuation detectable by the FBL. The reel diameter is short enough to stop the propagation of the optical pulse. The reel diameter able to stop the optical pulse is a function of the pulse wavelength. The reel being seen as the first major optical event, the FBL will measure the length of the deployed fiber up to the reel, i.e. the plug. However also, the diameter of the reel can not be too short; effectively reducing the diameter of the reel can limit the maximum measurable distance to an unacceptable value.

In a second embodiment, the reel has been specially modified so the reel presents a required minimum curvature short enough to be detected by the FBL. So, the reel can have various geometric shapes; importance is that within the various curvatures present in this reel, there is a minimum curvature (close to $r_c$) which is the required curvature short enough to be detected by the FBL. For example, the shape of the reel can be ovaloid with a wanted curvature. The wanted curvature is short enough to stop the propagation of the optical pulse. The wanted curvature able to stop the optical pulse is a function of the pulse wavelength.

In a third embodiment, the reel is made with a diameter not necessarily short even large, unable to stop the optical pulse and use the method as described above. In this case an additional element (not shown on the Figure) is added on the second position 4'. The additional element corresponds to mechanical path through which the fiber is unwound and bends at a radius short enough to stop the optical pulse. In fact, the additional element creates the optical event. The additional element can be simply an angled tube or an angled collar through which the fiber passes. The radius able to stop the optical pulse is a function of the pulse wavelength. All these advantageous embodiments ensure that the major optical event is located at the second position and is detected more precisely.

In a fourth embodiment, the fiber is coiled like in the second embodiment at a constant and large radius R, which is greater than the critical radius $r_c$ but with a truncation T greater than 1 (truncation of 1 corresponds to joint turns). As a consequence, even and odd fiber layers are netted and an optical event is created at each crossing of fiber turns belonging to successive layers. The fiber diameter being small compared to the coiling diameter, it can be easily established that the fiber bend radius created by the crossing of two fibers is an inverse function of the coil truncation T that can take any integer value greater than zero: $r_{crossing}=R/T$. For instance a 30 mm spool diameter with a truncation of 3 has the same optical response than a 10 mm radius spool coiled with the first embodiment. Like for the second embodiment, optical events are evenly distributed along the fiber. The distribution period being smaller than the length resolution of the OTDR, the spool manufacturing process does not alter the measurement resolution.

The key advantage of this technique is the possibility to perform this analysis from a single fiber end: the measurement is performed from the surface without any costly downhole equipment that would be destroyed when drilling operations resume once the cement is set.

Fibers are able to withstand a relatively high tensile force, but they become very fragile once the fiber jacket is damaged. It is important to consider a method to detect breaking of the fiber. If the fiber break occurs at the part 10A (so at a distance shorter than the previously measured one), the fiber is indubitably broken. If the fiber break occurs at the part 10B, it is impossible a priori to make the difference between a by-passed plug and a broken fiber. A first solution to detect the fiber break consists of analyzing the signal received and the attenuation. Effectively, the characteristic attenuation occurring for a "fictive" optical event, as described above (short reel diameter, curvature of the reel, additional element creating bend or curvature) is different from an attenuation occurring for a fiber break. This characteristic attenuation will inform on the break or not of the fiber.

A second solution consists of assuming that one can measure the true fiber length including its wound part simultaneously with the plug position. The solution consists to use two wavelengths, for instance 1550 nanometers and 1310 nanometers. At the longest wavelength the reel generates a large attenuation while at the shortest one the reel becomes almost transparent. This way, the fiber length measured at the longest wavelength is the distance between the first position and the second position; while the fiber length measured at the shortest wavelength is the true fiber length. The comparison of both measurements is an unambiguous way to make the difference between a non-moving plug and a broken fiber.

One aspect of the apparatus is that it can allow determining an absolute or a relative localization of the plug. Effectively, as said above, the winding of the fiber ensures that the deployed fiber (part 10A) has a known trajectory or curve and the FBL measures the length of the deployed fiber up to the plug. When the trajectory is rectilinear, there is a direct correlation between length of the deployed fiber from the surface to the plug and depth of the plug from the surface to the plug, an absolute position of the plug can be given. In the same way, length of the deployed fiber from one position to a second informs on the relative position of the plug from this first position to the second. When the trajectory is a helix or more complex curve, there is a link between length of the deployed fiber from the surface to the plug and depth of the plug from the surface to the plug, an absolute position of the plug can be given. For example for a helix of axis z, it will be $$l = z \cdot \sqrt{\left(\frac{2\pi \cdot r}{p}\right)^2 + 1},$$

where l is the length of the deployed fiber, z the depth or axial position, r is the radius of the helix and p is a constant giving the vertical separation of the helix's loops. In the same way, a relative position can be defined. The key advantage of this technique is the possibility to obtain the actual position or depth of the plug.

Another aspect of the apparatus is that it can allow determining a displacement of the plug. Effectively, as said above, the winding of the fiber ensures that the deployed fiber (part 10A) has a known trajectory or curve and the FBL measures the length of the deployed fiber up to the plug. Therefore, a speed or an acceleration of the plug can be determined function of time or function of depth.

The skilled in the art, who performs cement job, will also appreciate the use of this method even when precision of the position is not exact. Effectively, for cement job, exact localization of the plug is not required a precision of 1 meter is exaggerated, of 10 meters is excellent and of 100 meters is enough. It is understand that even if the trajectory of the deployed fiber is slightly changed or modified within the wellbore, it will have a low impact on the cement job because only importance will be to know if yes or no a plug is in a certain zone. This method is a great benefit. Also, for cement job, sometimes localization is not required, but the arrival of the plug to a certain position where it stops or slows down. So, information of the relative speed of the plug is enough. In this way, the method is also a great benefit.

FIG. 2 is a view of the apparatus deployed in a cased wellbore 1 with a slight improvement: the apparatus is deployed with one or more sensors informing on property of the environment surrounding the plug, as for example the cement. All the characteristics already described for the FIG. 1 are still applicable. A plug 20 is shown moving along the wellbore thanks to a wellbore fluid such as drilling mud that is pumped in behind the plug. An optic fiber line 10 or fiber which is wound in a reel 40 is attached to an upper portion of the plug. The reel 40 comprises an end of the fiber 5 which is linked to a sensor 50 located on the plug. The sensor can be or not in contact with the cement. On the other end of the fiber, the fiber is attached or fixed to a first position 4, or a reference which correspond here also to a static point. As it is understood, the fiber is unwound from the reel thanks to the movement of the plug at a second position 4', which correspond to a dynamic point. An upper part 10A of the fiber corresponds to the unwound fiber (between the first position and the second position) and a lower part 10B of the fiber corresponds to the wound fiber, still in the reel.

The first position 4 is located inside a cementing head 3. From this first position the fiber is linked to an Optical Time Domain Reflectometer (OTDR) or a Fiber Break Locator (FBL). As the plug is moving away from the cement head, the plug movement unwinds the fiber. The fiber length deployed within the wellbore does not present any particularity that could stop the propagation of the optical pulse (Part 10A). By creating an optical event at the plug level corresponding to the second position 4', the FBL will give the length of the deployed fiber to the plug.

On the first position 4, at least two signals, each made of a different wavelength, are injected into the fiber. The longest wavelength is attenuated by the first major optical event created by any of the techniques described above (short reel diameter, curvature of the reel, additional element creating bend or curvature). While, the shortest wavelength propagates up to the end of the fiber. The travel time on the long wavelength gives the measurement of the length of the deployed fiber to the plug while the shortest one can access to the sensor embedded within the plug. Embedded sensors within the plug would give the possibility to monitor the measured parameters during displacement and during wait on cement (WOC). More precisely, the parameter to measure during these well cementing phases is the temperature. During movement of the plug, it would be a convenient way to assess temperature simulations. During WOC, it would detect the temperature increase due to the exothermal reaction of setting cement.

The sensor 50 is an optical sensor of the type Bragg grating sensor. The Bragg grating sensors are realized by modulating the refraction index of an optical fiber line around its nominal value. They act as selective reflectors for the Bragg wavelength $\lambda_B$ defined by the following relationship: $\lambda_B = 2 \cdot n \cdot \Lambda$; where n is the refraction index of the fiber and $\Lambda$ the wavelength of the index modulation. $\Lambda$ being a linear function of temperature, measuring the Bragg wavelength $\lambda_B$ is a convenient way to measure the Bragg grating temperature typically at 1 degree Celsius. The key advantage of this technique is the fact that the measurement is remotely performed at the fiber end located at the surface (first position 4). Nothing else than the Bragg grating sensor is required at the plug level where the temperature measurement is performed.

Many other physical parameters are measurable using a miniaturized sensor self supplied in power. The associated electronics are small and with low consummation: a sensor with limited volume and limited power supply allow a minimum bulk. For example, sensors can be of the type MEMS. The sensor can also be auto-sufficient in terms of power supply, as for example an optical sensor: there is no need of conventional and costly packaging including electronics, powers supply and analyzing devices. For instance, Bragg gratings sensors can also be used for pressure measurement.

In another embodiment, multiple optical sensors may be arranged in a network or array configuration with individual sensors multiplexed using time division multiplexing or frequency division multiplexing, those sensors can be deployed within the plug or also along the fiber. Even, when Bragg grating sensors are used there is no need of using multiplexing; multiple Bragg grating sensors are arranged in network in series, each Bragg grating sensor having its wavelength and being interrogated by the light transmitter/receiver. Aim of deploying sensors along the fiber can provide a profile of measurement in the wellbore. Also, the network of sensors may provide an increased spatial resolution of temperature, pressure, strain, or flow data in the wellbore.

The present invention has been described for a plug in the case of a cementing job, wherein location of the plug and/or information on the WOC are important to define. Other applications of the apparatus and the method according to the invention include attaching the reel of wound fiber to any type of object moved within the well, as for example perforating gun, retrievable packer or any type of tools moved within the well, as for example a drilling tool, a logging tool, a logging-while-drilling tool, a measuring-while-drilling tool, a testing tool; any type of tool hanged by a drill pipe, a wireline cable, a coiled tubing. Other applications of the apparatus and the method according to the invention include fixing the first position on any of static or dynamic point, for example in subsea or downhole operations.

In another aspect, the fiber may be used to transmit signals to a downhole apparatus to effect the operation thereof as an operator or an actuator. In one embodiment, an optic fiber line may be disposed along the wellbore. Thereafter, signals may be transmitted through the fiber to operate a valve or to activate a sleeve for example. From the surface, at least two signals, each made of a different wavelength, are injected into the fiber. The longest wavelength is reflected by the first major optical event created by any of the techniques described above (bend made with the reel or bend made with an additional element). While, the shortest wavelength propagates up to the end of the fiber. The travel time on the long wavelength gives the measurement of the plug position while the shortest one can access to the actuator within the plug. The actuator can be self sufficient, actuating only by the wavelength or can further be connected to electronics and power supply ensuring to perform this action.

The invention claimed is:

1. An apparatus for determining the location and/or displacement of a dynamic object in a wellbore, comprising:
   a reel of wound optic fiber line fixed to the dynamic object, the reel having a radius between 20 mm and 50 mm; and
   a light transmitter/receiver device able to generate a signal through the optic fiber line and to measure a change of said signal as the dynamic object moves through the wellbore, wherein the device is an apparatus in the family of optical time domain reflectometers;
   wherein the optic fiber line is fixed on a first position to a reference point linked to the light transmitter/receiver device and the optic fiber line is unwound from the reel on a second position; wherein
   the light transmitter/receiver device operates at two light-pulse wavelengths, and is able to measure the change of said signal when occurring at the second position.

2. The apparatus of claim 1, further comprising an additional element on the second position able to create the change of said signal at the second position.

3. The apparatus of claim 1, wherein the light transmitter/receiver is a fiber break locator.

4. The apparatus of claim 1, wherein the object is made of a dart or a plug.

5. The apparatus of claim 1, wherein the optic fiber line is further linked to a sensor located on the dynamic object.

6. The apparatus of claim 5, wherein the sensor is a sensor self supplied in power.

7. The apparatus of claim 5, wherein the sensor is a Bragg grating sensor.

8. The apparatus of claim 5 wherein the sensor is a temperature sensor or a pressure sensor.

9. The apparatus of claim 1, wherein the optic fiber line further comprises a sensor located on the optic fiber line.

10. The apparatus of claim 9 wherein the sensor is a sensor self supplied in power.

11. The apparatus of claim 1, wherein the optic fiber line is further linked to an actuator located on the dynamic object.

12. A method for determining a location, a displacement, or both, of a dynamic object in a wellbore, comprising:
   (i) fixing a reel of wound optic fiber line to the dynamic object, the reel having a radius between 20 mm and 50 mm;
   (ii) fixing the optic fiber line on a first position to a reference point linked to a light transmitter/receiver device that operates at two light-pulse wavelengths, the device being an apparatus in the family of optical time domain reflectometers, wherein the reel attenuates the light pulse with the longer wavelength, and the reel attenuates the light pulse with the shorter wavelength to a lesser degree;
   (iii) moving the dynamic object so that the optic fiber line is unwound from the reel on a second position;
   (iv) generating from the first position a signal along the optic fiber line;
   (v) measuring a change at the first position of said signal along the optic fiber line as the dynamic object moves along the wellbore, wherein said change informs on the second position; and
   (vi) deducing from said change the location, the displacement, or both, of the dynamic object.

13. The method of claim 12, further comprising fixing means able to create the change of said signal at the second position.

14. The method of claim 12, further comprising the steps of:
   (i) fixing on the dynamic object, means for sensing a property of the environment surrounding the dynamic object and said means for sensing being linked to the optic fiber line; and
   (ii) deducing from said change of said signal the property of the environment surrounding the object.

15. The method of claim 12, further comprising the step of generating from the first position another or more signal along the optic fiber line.

16. The method of claim 15, wherein at least two signals are generated from the first position, and the measured change of one signal informs on the second position and the measured change of one other signal informs on a property of the environment surrounding the dynamic object.

17. The method of claim 12, further comprising the steps of
   (i) fixing on the dynamic object, means for actuating the dynamic object and said means for actuating being linked to the optic fiber line; and
   (ii) generating from the first position a second signal along the optic fiber line for actuating the dynamic object.

18. A method for determining the location of a dynamic object, displacement of a dynamic object or both in a wellbore, comprising:
   (i) attaching a reel of optical-fiber line to the dynamic object, the reel having a radius between 20 and 50 mm;
   (ii) attaching one end of the optical-fiber line from the reel to a first reference-point position;
   (iii) generating more than one signal in the optical-fiber line at the first reference-point position;
   (iv) moving the dynamic object so that optical fiber unwinds from the reel as the dynamic object moves to a second position;

(v) measuring an optical event at the first reference-point position; and (vi) deducing the location of the dynamic object, displacement of the dynamic object or both by analyzing the optical event.

19. The method of claim 18, wherein the optical event is a change in at least one signal and the deducing comprises comparing the change of at least one of the generated signals.

* * * * *